(12) United States Patent
Pritchard et al.

(10) Patent No.: US 8,235,198 B2
(45) Date of Patent: Aug. 7, 2012

(54) HYDRAULIC CLUTCH ASSEMBLY FOR A MOTOR VEHICLE DRIVELINE

(75) Inventors: Larry A. Pritchard, Macomb, MI (US); Philip J. Francis, Lapeer, MI (US); Thad Kopp, Oakland Township, MI (US); Tsunlock A. Yu, Saline, MI (US)

(73) Assignee: Borgwarner, Inc., Auburn Hills, MI (US)

( * ) Notice: Subject to any disclaimer, the term of this patent is extended or adjusted under 35 U.S.C. 154(b) by 434 days.

(21) Appl. No.: 12/622,529

(22) Filed: Nov. 20, 2009

(65) Prior Publication Data

US 2010/0122887 A1    May 20, 2010

Related U.S. Application Data

(60) Provisional application No. 61/116,308, filed on Nov. 20, 2008.

(51) Int. Cl.
*F16D 25/08* (2006.01)
*F16D 13/74* (2006.01)

(52) U.S. Cl. .................. 192/85.55; 192/113.34

(58) Field of Classification Search ........... 192/85.55, 192/85.53, 85.49, 85.6, 85.61, 113.34, 85.63; 60/585
See application file for complete search history.

(56) References Cited

U.S. PATENT DOCUMENTS

| | | | |
|---|---|---|---|
| 3,351,169 A * | 11/1967 | McIndoe | 192/85.61 |
| 3,683,618 A * | 8/1972 | Schacher et al. | 60/494 |
| 4,648,492 A | 3/1987 | Moore | |
| 4,769,989 A * | 9/1988 | Ostwald et al. | 60/394 |
| 5,011,237 A | 4/1991 | Matouka et al. | |
| 5,407,024 A | 4/1995 | Watson et al. | |
| 5,484,193 A | 1/1996 | Fuller et al. | |
| 5,611,407 A | 3/1997 | Maehara et al. | |
| 5,875,865 A | 3/1999 | Wakahara et al. | |
| 5,878,624 A | 3/1999 | Showalter et al. | |
| 5,934,432 A | 8/1999 | Bates | |
| 6,033,334 A | 3/2000 | Showalter | |
| 6,047,546 A | 4/2000 | Takeyama | |
| 6,092,637 A | 7/2000 | Otto et al. | |
| 6,247,569 B1 | 6/2001 | McGuire et al. | |
| 6,354,977 B1 | 3/2002 | Brown et al. | |
| 6,464,612 B2 | 10/2002 | Frost | |
| 6,595,338 B2 | 7/2003 | Bansbach et al. | |
| 6,655,756 B2 | 12/2003 | Riddiford et al. | |
| 6,883,657 B2 | 4/2005 | Bansbach et al. | |
| 7,172,528 B2 | 2/2007 | Yu et al. | |
| 2002/0162328 A1 | 11/2002 | Shaw et al. | |
| 2003/0136618 A1 | 7/2003 | Frey et al. | |

(Continued)

*Primary Examiner* — David D Le
*Assistant Examiner* — Lillian Nguyen
(74) *Attorney, Agent, or Firm* — Brinks Hofer Gilson & Lione (57) ABSTRACT

A hydraulic clutch assembly for a motor vehicle driveline is provided. The clutch assembly comprises an input member, and output member and a friction clutch pack operably disposed therebetween for controlling torque transfer. A first fluid circuit contains hydraulic based fluid at a first pressure and is in fluid communication with the friction clutch pack for lubrication thereof. A second fluid circuit is in fluid communication with the first fluid circuit for replenishing the second fluid circuit with the hydraulic based fluid at a second pressure that is less than the first pressure. The clutch assembly further comprises a motor and a gear train. A first piston is in fluid communication with the second fluid circuit for delivering the hydraulic based fluid thereto A second piston is translated by the hydraulic based fluid displaced by the first piston to actuate the friction clutch pack.

27 Claims, 5 Drawing Sheets

U.S. PATENT DOCUMENTS

| | | |
|---|---|---|
| 2004/0066552 A1 | 4/2004 | Werba |
| 2005/0167232 A1 * | 8/2005 | Kosugi et al. ............... 192/85 R |
| 2005/0277509 A1 | 12/2005 | Showalter |
| 2007/0137966 A1 | 6/2007 | Francis et al. |

* cited by examiner

HYDRAULIC CLUTCH ASSEMBLY FOR A MOTOR VEHICLE DRIVELINE

CROSS REFERENCE TO RELATED APPLICATIONS

This application is related to and claims all available benefit of U.S. provisional patent application 61/116,308 filed Nov. 20, 2008, the entire contents of which are herein incorporated by reference.

BACKGROUND OF THE INVENTION

1. Field of the Invention

This invention relates generally to a hydraulic clutch and more particularly, to a hydraulic clutch assembly that includes a multiple plate friction clutch pack for use in a motor vehicle driveline.

2. Background

Hydraulically actuated clutches are common components that are used in rotary powered transmission systems, such as for example, transfer cases, rear differentials and front differentials. These clutches are controlled through a hydraulic fluid circuit. Conventional hydraulic fluid circuits for clutch actuation are closed systems, which include a fluid reservoir within the driveline assembly to accommodate a loss of fluid due to leakage, and changes in the system due to thermal effects and etc. Over a period of time and from usage of the clutch system, the driveline assembly may lose some of the hydraulic fluid from the hydraulic fluid circuit, such as for example, via leakage of the hydraulic fluid through the seals. Accordingly, the reservoir may need to be accessed externally by a technician or otherwise for replenishing the hydraulic fluid circuit with hydraulic fluid. For many vehicles, however, access to the reservoir which is located within the driveline assembly is difficult because of the tight packaging of driveline components surrounding the reservoir and the corresponding tortuous pathway to the reservoir. Thus, further improvements and enhancements in hydraulic clutch systems for motor vehicle drivelines may be desirable.

BRIEF SUMMARY OF THE INVENTION

In one embodiment of the present invention, a hydraulic clutch assembly for a motor vehicle driveline is provided. The clutch assembly comprises an input member and an output member. A friction clutch pack is operably disposed between the input and output members for controlling torque transfer between the two members. A first fluid circuit contains a hydraulic based fluid at a first pressure and is in fluid communication with the friction clutch pack for lubricating the clutch pack. In fluid communication with the first fluid circuit is a second fluid circuit which has a reservoir. The first fluid circuit replenishes the reservoir with the hydraulic based fluid at a second pressure that is less than the first pressure. A motor and a gear train are also included. The gear train has an input force, which is driven by the motor, and an output force. In fluid communication with the second fluid circuit is a first piston. The second fluid circuit is for delivering the hydraulic based fluid from the reservoir to the first piston. The first piston is driven by the output force to displace the hydraulic based fluid. A second piston is translated by the displaced hydraulic based fluid to actuate the friction clutch pack.

In one aspect, the second fluid circuit has a compensation port that is in fluid communication with the reservoir. The motor is a bi-directional electric motor, which includes a rotor, and the gear train has the input force that is driven by the electric motor. An electric brake is for selectively inhibiting rotation of the rotor. A ball screw is driven by the output force. The first piston is in fluid communication with the reservoir via the compensation port for delivery of the hydraulic based fluid and is driven by the ball screw to displace the hydraulic based fluid.

Further aspects, features, and advantages of the present invention will become apparent from consideration of the following description and the appended claims when taken in connection with the accompanying drawings.

DETAILED DESCRIPTION OF THE INVENTION

Detailed embodiments of the present invention are disclosed herein. It is understood, however, that the disclosed embodiments are merely exemplary of the invention and may be embodied in various and alternative forms. The Figures are not necessarily to scale; some figures may be configured to show the details of a particular component. Therefore, specific structural and functional details disclosed herein are not to be interpreted as limiting but merely as a representative bases for the claims and for teaching one skilled in the art to practice the present invention.

Figure 1:
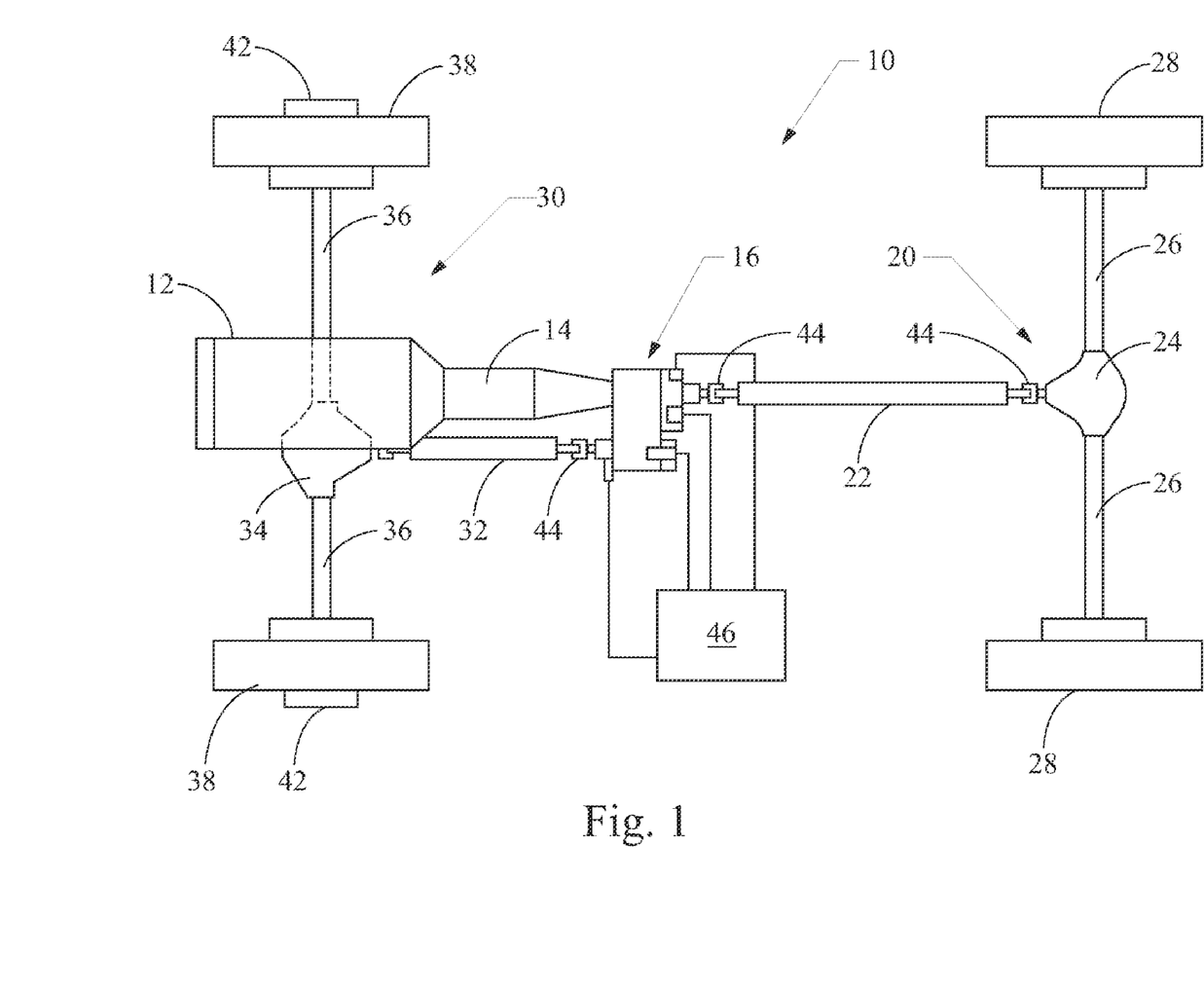
FIG. 1 is a plan view of a motor vehicle driveline including a transfer case in accordance with an embodiment of the present invention.

Referring to FIG. 1, a vehicle driveline system incorporating at least one embodiment of the present invention is illustrated and generally designated by the reference numeral 10. The vehicle drive system 10 includes an engine 12 which drives a transmission 14. The transmission 14 may be a manual transmission with a clutch or an automatic transmission. The output of the transmission 14 drives a transfer case assembly 16. In turn, the transfer case assembly 16 is operably coupled to and drives a rear or primary driveline assembly 20. The primary driveline 20 has a rear or primary drive shaft 22 which is operably coupled to and drives a rear or primary differential 24. The primary differential 24 drives a pair of aligned primary or rear axles 26 which are each coupled to a primary or rear tire and wheel assembly 28.

The transfer case assembly 16 also provides torque to a front or secondary driveline assembly 30. The secondary driveline 30 includes a front or secondary drive shaft 32 which in turn drives the front or secondary differential 34. The secondary differential 34 provides drive torque through a pair of aligned front or secondary axles 36 which are each coupled to a front or secondary tire and wheel assembly 38.

In one embodiment, locking hubs 42 are operably disposed between the front or secondary pair of axles 36 and the front tire and wheel assemblies 38. The locking hubs 42 may be either remotely operated and thus include electrical or pneumatic operators or may be manually activated. Alternatively, front axle disconnects (not illustrated) may be housed within the secondary differential 34 and may be activated or deactivated to couple or uncouple the secondary axles 36 from the output of the secondary differential 34.

Both the primary driveline 20 and the secondary driveline 30 include suitable and appropriately disposed universal joints 44 which may be of conventional type or so-called "constant velocity" joints. The universal joints may function in a convention fashion to allow static and dynamic offsets and misalignments between the various shafts and components.

The system 10 also includes a microcontroller 46 having various programs and sub-routines which receive data from various vehicle sensors. The microcontroller in response to the data provides a control output to achieve the design goals of the present invention which will be more fully described below.

Figure 2:
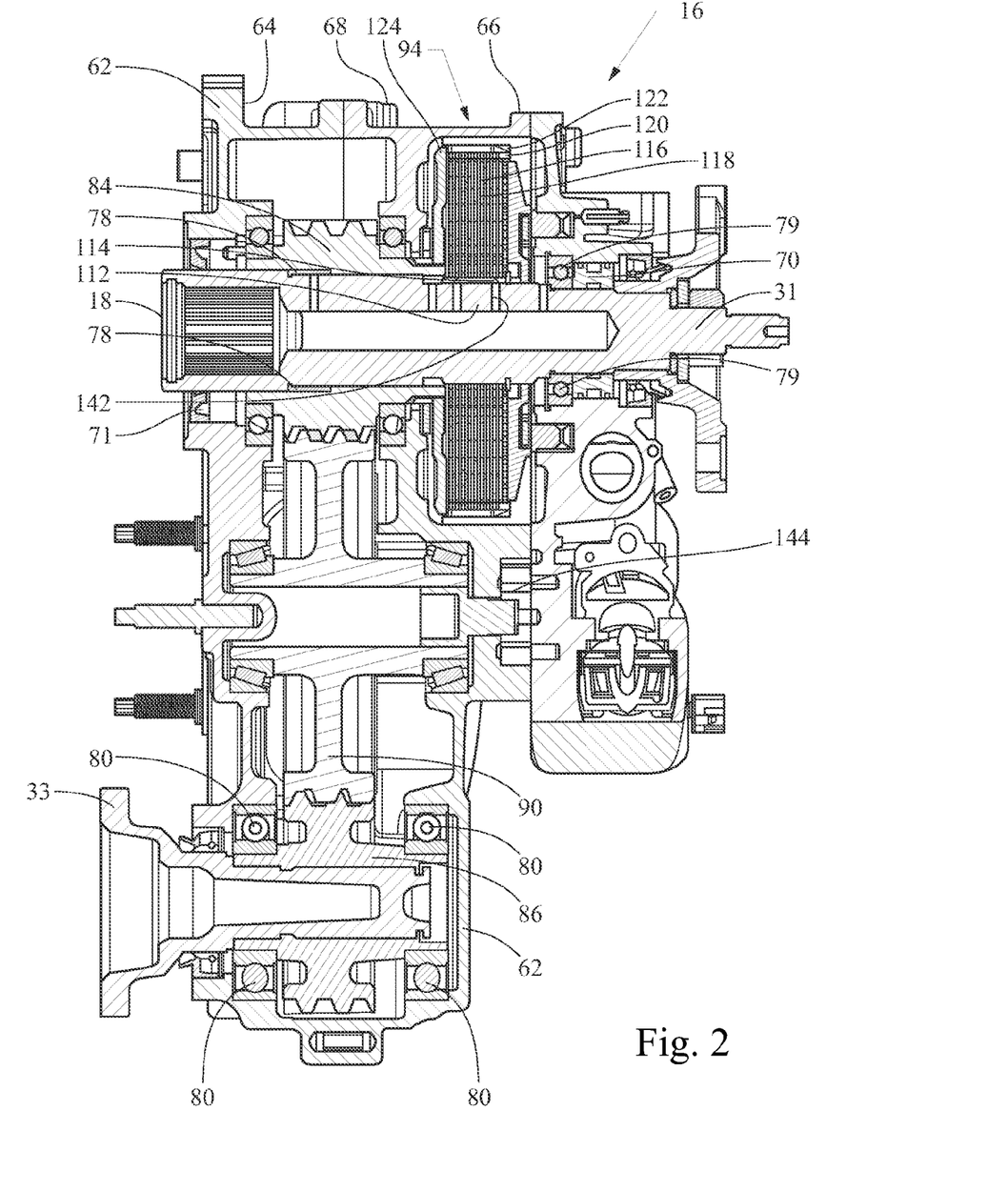
FIG. 2 is a sectional view of a motor vehicle transfer case in accordance with one embodiment of the present invention.

FIG. 2 is a cross-sectional view of the transfer case assembly 16 incorporating at least one embodiment of the present invention. It should be noted, however, that although various embodiments of the present invention are described herein as being incorporated within the transfer case assembly 16, it will be readily appreciated by those skilled in the art that various other embodiments of the present invention may be incorporated into other vehicle driveline assemblies, such as for example, the primary and/or secondary differential assemblies 20 and 30.

The output drive power from the transmission 14 is provided to the transfer case 16 by an input shaft 18. The input shaft 18, the rear output shaft 31 and the front output shaft 33 extend from an outer housing 62 of the transfer case 16. The rear and front output shafts 31 and 33 are correspondingly coupled to the primary and secondary drive shafts 22 and 32, e.g. via universal joints 44.

In one embodiment, the housing 62 includes two housing halves 64 and 66 secured together by bolts 68. The housing 62 includes various seals 70 and 71, recesses, shoulders, flanges, bores, etc. that receive and position the various components and parts of the transfer case 16 discussed herein. The input shaft 18 is coupled to the rear output shaft 31 for AWD and 2-wheel drive. The rear output shaft 31 is rotably mounted on bearings 78 and 79 at opposite ends.

The front output shaft 33 is rotably mounted within the housing 62 on bearings 80. The input gear 84 is selectively driven through a clutch 94 by the rear output shaft 31 and is concentric therewith. A front output gear 86 is coupled to the front output shaft 33 and rotates therewith. An idler gear 90 is coupled to the input gear 84 and the front output gear 86. When the transfer case 16 is in the two-wheel drive mode, the input gear 84 rotates freely on the rear output shaft 31 and thus, no output drive power is applied to the front output shaft 33.

To initiate the AWD or 4-WD mode, the clutch 94 is activated to controllably and selectively provide rotational energy to the input gear 84 so that it will provide rotational energy as needed or selected to the front wheels 38 through a series of rotationally coupled parts. In this mode, shafts 22 and 32 (FIG. 1) may be allowed to rotate at different speeds for smooth vehicle handling. When the clutch 94 is fully in the AWD mode, the clutch 94 and the input gear 84 will be more fully coupled and will rotate at the same speed or nearly the same speed with only some slippage. In this mode, the rear and front drive shafts 22 and 32 rotate at or closer to the same speed.

Figure 4:
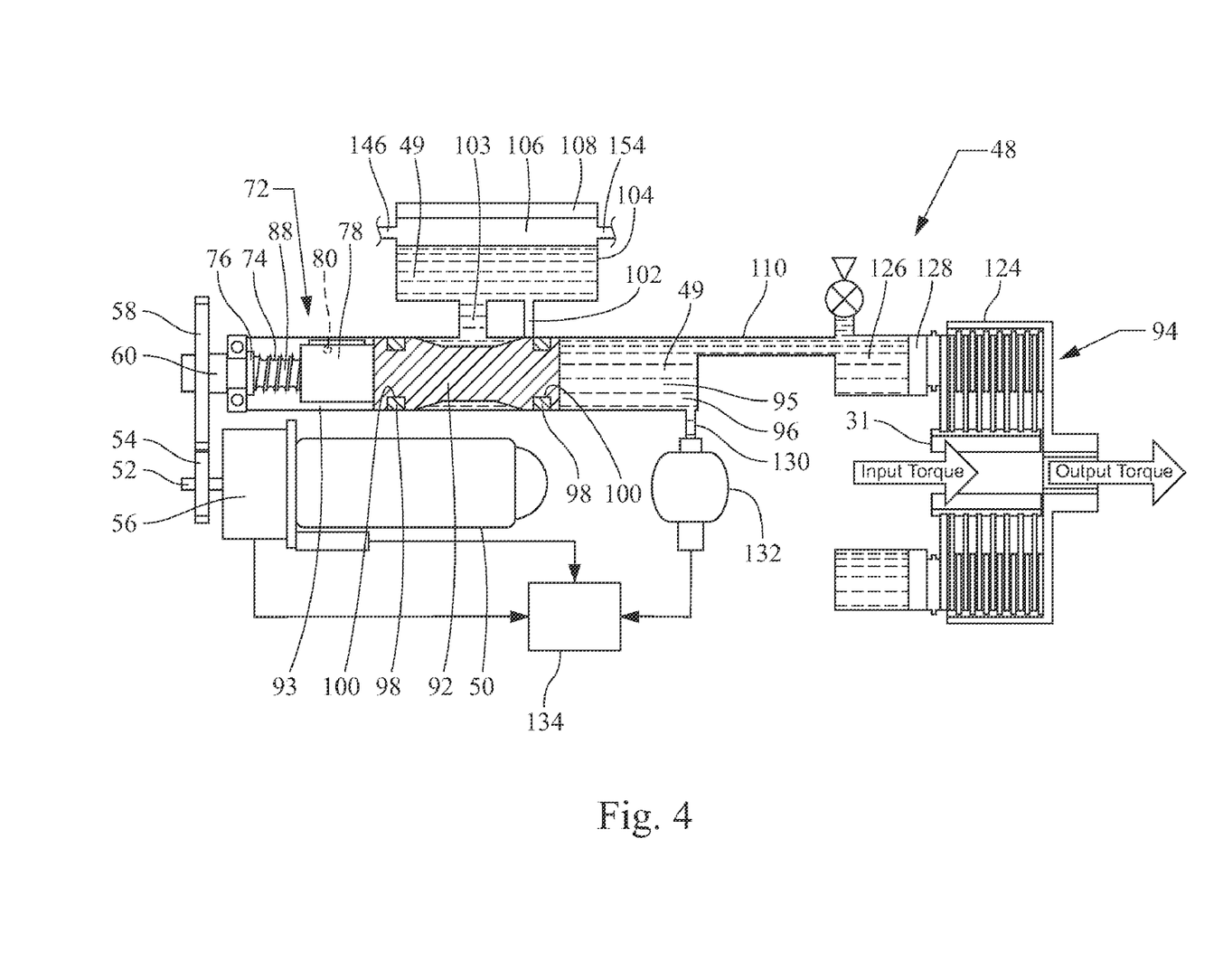
FIG. 4 is a schematic representation of a hydraulic clutch assembly including a hydraulic fluid circuit in accordance with one embodiment of the present invention.

Referring also to FIG. 4 is one embodiment of a hydraulic clutch assembly 48, which includes the clutch 94, in accordance with the present invention. The hydraulic clutch assembly 48 is located within the housing 62 and is operable to actuate the clutch 94. The clutch assembly 48 includes a hydraulic fluid circuit 49 containing a hydraulic based fluid or hydraulic fluid, e.g., hydrocarbon based oil, synthetic oil, silicone fluid or any other suitable fluid for hydraulic actuation.

Operating the hydraulic clutch assembly 48 is a bi-directional, fractional horsepower electric motor 50 which is disposed within a suitably sized region of the housing 62. The electric motor 50 includes an output shaft 52 that may optionally be supported upon suitable bearings (not shown). The drive shaft 52 is coupled with a spur gear 54 and an electric brake 56. When electric power is provided to the electric motor 50, the electric motor 50 rotates the output shaft 52 and the spur gear 54. When electric power to the electric motor 50 is terminated, system forces may attempt to back drive the electric motor 50. The electric brake 56 inhibits further reverse rotation of the output shaft 52 and thus the spur gear 54.

In one embodiment, the spur gear 54 is in constant mesh with a second spur gear 58. The second spur gear 58 is secured to a second drive shaft 60 that is support by anti-friction bearings such as a roller bearing assembly 72. The second drive shaft 60 includes a ball screw portion 74. Between the drive shaft 60 and the ball screw portion 74 is mounted at least one spring or washer 76 that functions as a resilient stop. Disposed about the ball screw portion 74 is a re-circulating ball nut 78. The re-circulating ball nut 78 includes at least one ball or roller bearing 80 which will re-circulate about a complimentary configured groove 88 in the ball screw 74 and thus, provides a low friction interconnection between the ball screw 74 and the nut 78. As the shaft 60 bi-directionally rotates in response to bi-directional rotation of the output shaft 52 of the electric motor 50, the re-circulating ball nut 78 translates to the left and right. The ball screw portion 74 and the re-circulating ball nut 78 thus function as a rotary to linear motion actuator.

The re-circulating ball nut 78 is coupled to a source piston 92 (e.g. master piston) which translates axially between a retracted position 93 and an extended position 95 within an elongated cylinder 96. The source piston 92 includes a pair of high-pressure seals 98 which are received in suitable configured circumferential grooves 100 near each end of the piston 92. The piston 92 in FIG. 4 is shown in a partially retracted position (e.g. between the fully retracted position 93 and the fully extended position 95). As the piston 92 is retracted by rotation of the ball screw nut 78, it passes a compensation port 102 which is in fluid communication with a fluid reservoir 104. The fluid reservoir 104 is preferably maintained substantially full of the hydraulic based fluid. In the retracted position 93, the compensation portion 102 is unobstructed by the source piston 92 to advance the hydraulic based fluid into the elongated cylinder 96.

Additionally, a secondary port 103 may be provided which is in fluid communication with both the reservoir 104 and the source piston 92 and is positioned along the elongated cylinder 96 to provide lubrication between the source piston 92 and the elongated cylinder 96 with the hydraulic based fluid. In at least one embodiment, the hydraulic based fluid is suitable as both a lubrication fluid and a hydraulic fluid. In one embodiment, a flexible diaphragm/separator 106 within the reservoir 104 may be used to accommodate any changes in volume of the hydraulic based fluid and a metal plate or cap 108 may be used to secure the flexible diaphragm/separator 106 in position. In an alternative embodiment, the reservoir 104 does not include a diaphragm/separator 106.

The elongated cylinder 96 narrows to a first fluid passageway 110. The first fluid passageway 110 communicates with an annular cylinder 126 which includes a pressure plate 128 (e.g. slave or apply piston). In one embodiment, the pressure plate is in the form of a bonded piston with rubber seals bonded onto a monolithic base metal. When the source piston 92 is in the extended position 95, the hydraulic based fluid is displaced from the elongated cylinder 96 through the first fluid passageway 110 into the annular cylinder 126. The pressure plate 128 transfers axial motion from the displaced hydraulic based fluid to the clutch 94, thereby activating or engaging the clutch 94.

In one embodiment, a second fluid passageway 130 provides fluid communication between the elongated cylinder 96 and a fluid pressure sensor or transducer 132. The pressure fluid sensor 132 is preferably a piezoelectric device which provides a signal in a single or multiple conductor cable to a microprocessor 134 regarding the real time hydraulic pressure within the elongated cylinder 96. Electrical energy is provided to the electric motor 50 through a single or multiple conductor cable to control actuation of the source piston 92.

In at least one embodiment of the present invention, the clutch 94 is in the form of a multiple plate friction clutch pack assembly. In the activated or engaged condition, the friction clutch pack assembly 94 is driven by a plurality of male or external splines or teeth 112 disposed on the rear output shaft 31 (e.g. providing input torque) which engages complimentarily configured female splines 114 on the first plurality of smaller diameter friction clutch plates or discs 116. The first plurality of friction clutch plates or discs 116 are interleaved with a second plurality of larger diameter friction clutch plates or discs 118. The friction clutch plates or discs 116 and 118 may include suitable clutch paper or friction material in accordance with convention practice.

Each of the second plurality of larger diameter friction clutch plates or discs 118 include male or external splines 120 which engage and drive complimentary configured female or internal splines 122 formed on the interior of a cylindrical portion of a clutch drum 124 (e.g. receiving output torque). The clutch drum 124 is engaged with the input gear 84 and receives torque from the hydraulic clutch assembly 48 to drive the input gear 84. Suitable oil seals prevent the ingress of foreign materials and maintain a fluid tight seal between the housing 62, the rear output shaft 31 and the clutch drum 124.

Figure 3:
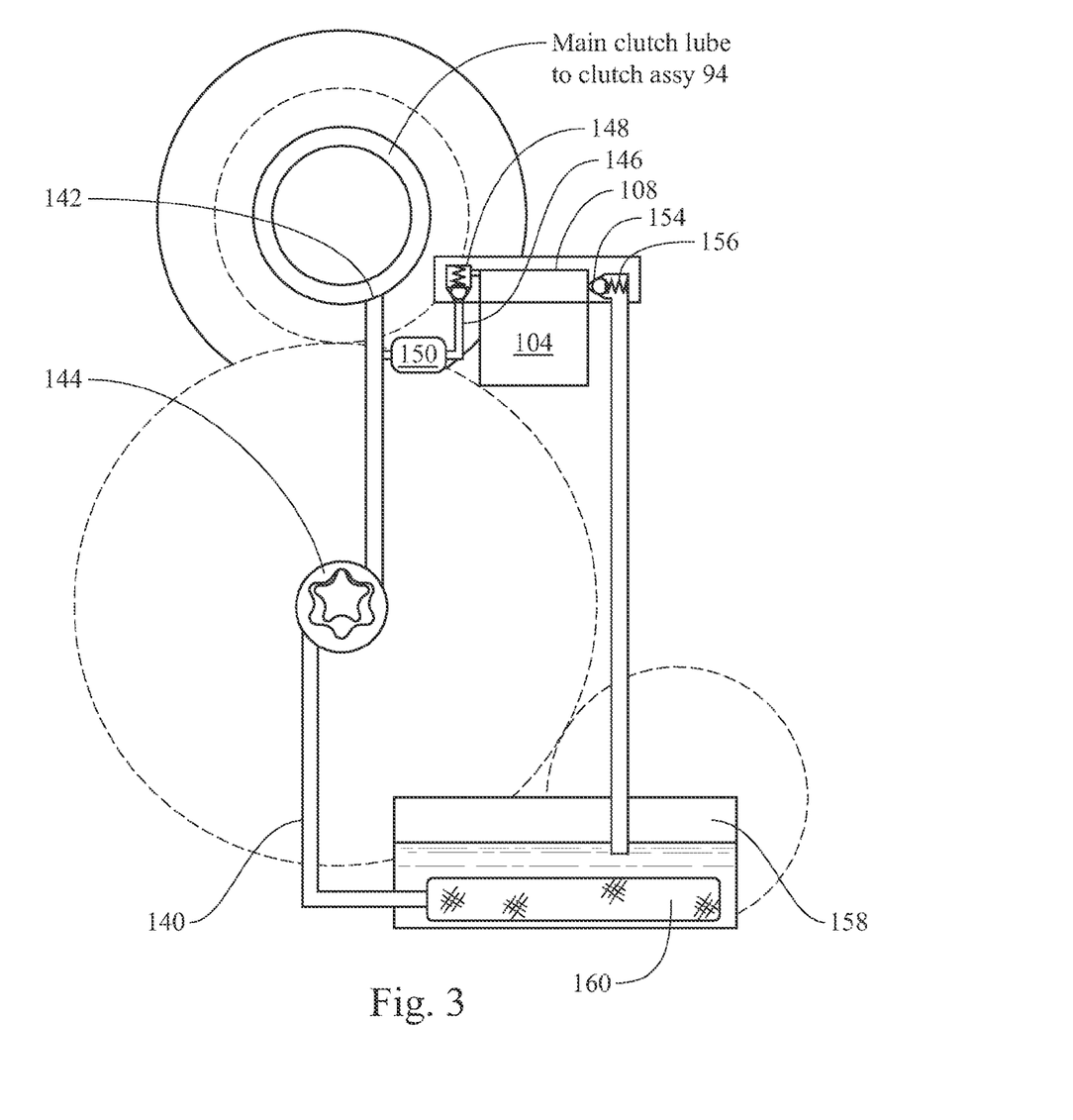
FIG. 3 is a schematic representation of a lubrication fluid circuit in accordance with one embodiment of the present invention.

Also referring to FIG. 3, a lubrication fluid circuit 140 is in fluid communication with the reservoir 104. The lubrication fluid circuit 140 is provided within the housing 62 and contains the hydraulic based fluid. The hydraulic fluid circuit 49 is open to and receives hydraulic based fluid from the lubrication fluid circuit 140. Accordingly, any hydraulic based fluid that may have escaped from the hydraulic fluid circuit 49, e.g., weeping through seals, etc., is preferably replenished by the oil base fluid from the lubrication fluid circuit 140, thereby minimizing or eliminating the need to externally access the reservoir 104 for replenishing with the hydraulic based fluid.

In one embodiment, the lubrication fluid circuit 140 is in fluid communication with the clutch assembly 94 (forming a "wet clutch assembly") and provides a lubricating interface for the clutch assembly 94 and between the clutch assembly 94 and the rear output shaft 31 and/or the clutch drum 124, e.g., via the clutch lube port 142.

A pump 144 (e.g. gerotor pump), which is illustrated in this example as being an off-axis pump, is in fluid communication with the lubrication fluid circuit 140 and is used to pressurize and drive the oil base fluid through the lubrication fluid circuit 140. In one embodiment, the pressure of the hydraulic based fluid in the lubrication fluid circuit 140 is greater than about 100 psig.

In the illustrated example, the lubrication fluid circuit 140 is in fluid communication with the hydraulic fluid circuit 49 via an inlet port 146. The hydraulic based fluid is advanced from the lubrication fluid circuit 140 through the inlet port 146 and into the reservoir 104 for replenishing the hydraulic fluid circuit 49 with the hydraulic based fluid.

The relatively high pressure of the hydraulic based fluid from the lubrication fluid circuit 140 is reduced prior to being introduced into the reservoir 104. In one example, the hydraulic based fluid in the reservoir 104 has a pressure that is less than about 20 psig. As illustrated in FIG. 3, an inlet check valve 148 may be disposed in the inlet port 146 for reducing the pressure of the hydraulic based fluid being advanced into the reservoir 104. Additionally, a filter 150 may be disposed within the inlet port 146 for removing debris from the hydraulic based fluid, providing a relative clean stream of hydraulic based fluid for replenishing the reservoir 104. In one example, the filter 150 reduces the pressure of the hydraulic based fluid being delivered to the reservoir 104.

Any excess hydraulic based fluid from the reservoir 104 is returned to the lubrication fluid circuit 140 via a return port 154. A return check valve 156 may be positioned in the return port 154 for controlling the amount of hydraulic based fluid returning to the lubrication fluid circuit 140. Alternatively, the return port 154 may be open (e.g. without a valve) for returning any excess hydraulic fluid to the lubrication fluid circuit 140.

The lubrication fluid circuit 140 includes a sump 158 that is preferably upstream from the pump 144 and is for containing a supply of the hydraulic based fluid. The sump 158 has a filter 160 for capturing any debris in the hydraulic based fluid prior to being advanced through the pump 144.

Figure 5:
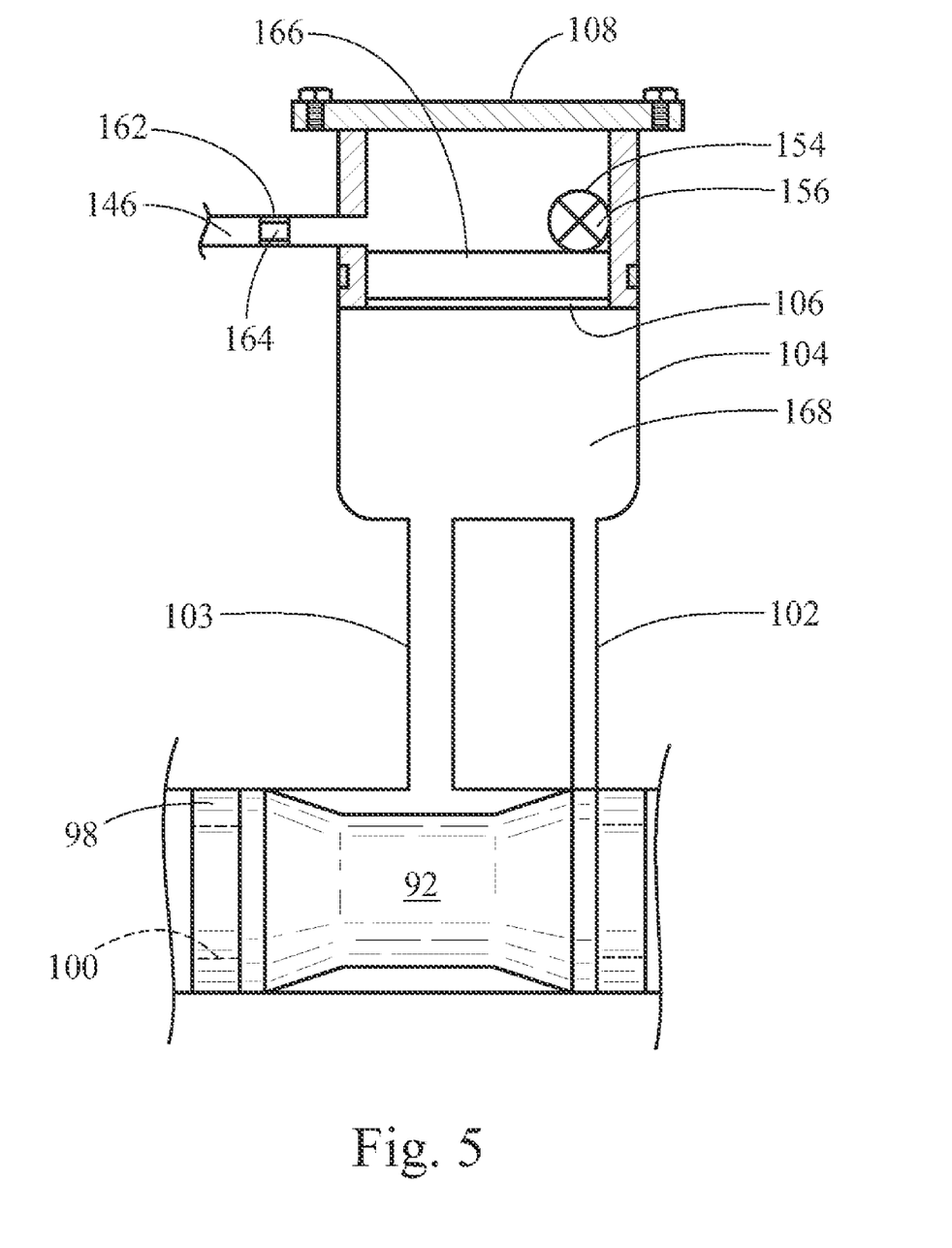
FIG. 5 is a side sectional view of a fluid reservoir for fluid communication between the lubrication and hydraulic fluid circuits in accordance with one embodiment of the present invention.

Referring to FIG. 5 is an alternative configuration for replenishing the hydraulic fluid circuit 49 with the hydraulic based fluid from the lubrication fluid circuit 140. An orifice plug 162 is positioned within the inlet port 146 that feeds the reservoir 104. A restricted opening 164 (e.g. narrow opening), which is formed through the orifice plug 162, reduces the pressure of the hydraulic based fluid being delivered to the reservoir 104. In one example, the hydraulic based fluid is delivered continuously to the reservoir through the restricted opening 164 keeping the reservoir substantially full of the fluid.

The filter 166 (e.g. a micron filter) is positioned above the main chamber 168 of the reservoir 104 for capturing any debris in the hydraulic based fluid. The main chamber 168 provides the hydraulic based fluid to the source piston 92 via the compensation port 102 and the secondary port 103 as described earlier.

The return port 154 and the inlet port 146 are preferably positioned adjacent to the diaphragm-filter 106 and 166 and opposite the main chamber 168. It is believed that this configuration will facilitate removing any excess hydraulic based fluid from the reservoir 104. That is, the excess hydraulic based fluid may flow directly from the inlet port 146 across the diaphragm-filter 106 and 166 to the return port 154 without descending into the main chamber 168 when the main chamber 168 is substantially full of the hydraulic based fluid. An outlet valve 170 may also be disposed in the return port 154 for controlling the outflow of the hydraulic based fluid from the reservoir 104. The return port 154 provides a fluid pathway for returning the excess hydraulic based fluid to the lubrication circuit 140.

As a person skilled in the art will readily appreciate, the above description is meant as an illustration of the implementation of the principles of this invention. This description is not intended to limit the scope or application of this invention in that the invention is susceptible to modification, variation, and change, without departing from the spirit of this invention as defined in the following claims.

The invention claimed is:
1. A hydraulic clutch assembly for a motor vehicle driveline, the clutch assembly comprising:
an input member (31), an output member (124) and a friction clutch pack (94) operably disposed therebetween for controlling torque transfer between the input and output members (31, 124);
a first fluid circuit (140) containing hydraulic based fluid at a first pressure and being in fluid communication with the friction clutch pack (94) for lubrication thereof;
a second fluid circuit (49) having a reservoir (104) and being in fluid communication with the first fluid circuit (140) for replenishing the reservoir (104) with the hydraulic based fluid at a second pressure that is less than the first pressure;
a motor (50) and a gear train (54, 58), the gear train (54, 58) having an input force driven by the motor (50) and an output force;
a first piston (92) in fluid communication with the second fluid circuit (42) for delivering the hydraulic based fluid from the reservoir (104) to the first piston (92), the first piston (92) operatively driven by the output force to displace the hydraulic based fluid; and
a second piston (128) translated by the hydraulic based fluid displaced by the first piston (92) to actuate the friction clutch pack (94).
2. The clutch assembly according to claim 1 wherein the hydraulic based fluid is communicated from the first fluid circuit (140) to the reservoir (104) via an inlet port (146) along which pressure of the hydraulic based fluid is reduced for introduction into the reservoir (104).
3. The clutch assembly according to claim 2 wherein the first pressure is greater than about 100 psig and the second pressure is less than about 20 psig.
4. The clutch assembly according to claim 2 wherein the inlet port (146) has a restricted opening (164) that reduces the pressure of the hydraulic based fluid being communicated to the reservoir (104).
5. The clutch assembly according to claim 2 further comprising an inlet check valve (148) disposed in the inlet port (146), the inlet check valve (148) reducing the pressure of the hydraulic based fluid being communicated to the reservoir (104).
6. The clutch assembly according to claim 2 further comprising a return port (154) and an outlet check valve (156) disposed in the return port (154), the return port (154) providing fluid communication from the reservoir (104) to the first fluid circuit for limiting the amount of hydraulic based fluid contained within the reservoir (104) and the outlet check valve (156) for limiting the pressure of the hydraulic based fluid in the reservoir (104).
7. The clutch assembly according to claim 2 further comprising a filter (150) disposed within the inlet port (146) for removing debris from the hydraulic based fluid used to replenish the reservoir (104).
8. The clutch assembly according to claim 7 wherein the filter (150) reduces the pressure of the hydraulic based fluid being communicated to the reservoir (104).

9. The clutch assembly according to claim 2 further comprising a filter (166) disposed within the reservoir (104) for removing debris from the hydraulic based fluid used to replenish the reservoir (104).
10. The clutch assembly according to claim 1 wherein the second fluid circuit (48) has a compensation port (102) for delivering the hydraulic based fluid from the reservoir (104) to the first piston (92).
11. The clutch assembly according to claim 10 further comprising an elongated cylinder (96), the first piston (92) movably disposed in the elongated cylinder (96) between a retracted position (93) and an extended position (95), the first piston (92) in the retracted position (93) defines an open chamber in the elongated cylinder (96) that receives the hydraulic based fluid from the compensation port (102), and the first piston (92) in the extended position (95) displaces the hydraulic based fluid and defines a closed chamber in the elongated cylinder (96) that is cutoff from fluid communication with the compensation port (102).
12. The clutch assembly according to claim 11 wherein pressure of the hydraulic based fluid in the closed chamber is greater than about 100 psig.
13. The clutch assembly according to claim 11 wherein the first piston (92) has a proximal portion and a distal portion opposite the proximal portion, the distal portion disposed adjacent to the open and closed chambers correspondingly in the retracted and extended positions (93, 95), the clutch assembly further comprising a first seal (98) disposed about the proximal portion and a second seal (98) disposed about the distal portion, the second seal (98) disposed between the compensation port (102) and the closed chamber when the first piston (92) is in the extended position (95) for obstructing fluid communication between the compensation port (102) and the closed chamber, and the second seal (98) disposed opposite the compensation port (102) and the open chamber when the first piston (92) is in the retracted position (93) for opening fluid communication between the compensation port (102) and the open chamber.
14. The clutch assembly according to claim 10 wherein the second fluid circuit (48) has a secondary port (103) in fluid communication with both the reservoir (104) and the first piston (92) for providing the hydraulic based fluid to the first piston (92) for lubrication thereof.
15. The clutch assembly according to claim 1 wherein the motor (50) is a bi-directional electric motor, and the clutch assembly further comprises an electric brake (56) for selectively inhibiting actuation of the bi-directional electric motor (50).
16. The clutch assembly according to claim 15 further comprising a microprocessor (134) having a signal output adapted to bi-directionally drive the motor (50).
17. The clutch assembly according to claim 1 further comprising a ball screw (72) driven by the output to drive the first piston (92).
18. The clutch assembly according to claim 1 further comprising a pressure sensor (132) for providing a signal representing pressure of the hydraulic based fluid being displaced by the first piston (92).
19. The clutch assembly according to claim 1 wherein the friction clutch pack (94) includes a first plurality of clutch plates (116) coupled to the input member (31) and a second plurality of clutch plates (118) interleaved with the first plurality of clutch plates (116) and coupled to the output member (124).
20. The clutch assembly according to claim 1 wherein the reservoir (104) is continuously replenished with the hydraulic based fluid from the first circuit (140).

21. A hydraulic clutch assembly for a motor vehicle driveline, the clutch assembly comprising:
- an input member (31), an output member (124) and a friction clutch pack (94) operably disposed therebetween for controlling torque transfer between the input and output members (31, 124);
- a first fluid circuit (140) containing hydraulic based fluid at a first pressure and being in fluid communication with the friction clutch pack (94) for lubrication thereof;
- a second fluid circuit (49) having a reservoir (104) and a compensation port (102) that is in fluid communication with the reservoir (104), the reservoir (104) is further in fluid communication with the first fluid circuit (140) for being replenished with the hydraulic based fluid at a second pressure that is less than the first pressure;
- a gear train (54, 58) and an electric motor (50), the gear train (54, 58) having an input force driven by the electric motor (50) and an output force;
- an electric brake (56) for selectively inhibiting actuation of the electric motor (50);
- a ball screw (72) driven by the output force;
- a first piston (92) in fluid communication with the reservoir (104) via the compensation port (102) for delivering the hydraulic based fluid from the reservoir (104) to the first piston (92), the first piston (92) driven by the ball screw (72) to displace the hydraulic based fluid; and
- a second piston (128) translated by the hydraulic based fluid displaced by the first piston (92) to actuate the friction clutch pack (94).

22. The clutch assembly according to claim 21 wherein the hydraulic based fluid is communicated from the first fluid circuit (140) to the reservoir (104) via an inlet port (146) along which pressure of the hydraulic based fluid is reduced for introduction into the reservoir (104).

23. The clutch assembly according to claim 22 wherein the inlet port (146) has a restricted opening (164) that reduces the pressure of the hydraulic based fluid being communicated to the reservoir (104).

24. The clutch assembly according to claim 22 further comprising an inlet check valve (148) disposed in the inlet port (146), the inlet check valve (148) reducing the pressure of the hydraulic based fluid being communicated to the reservoir (104).

25. The clutch assembly according to claim 22 further comprising a return port (154) and an outlet check valve (156) disposed in the return port (154), the return port (154) providing fluid communication from the reservoir (104) to the first fluid circuit (140) for limiting the amount of hydraulic based fluid contained within the reservoir (104) and the outlet check valve (156) for limiting the pressure of the hydraulic based fluid in the reservoir (104).

26. The clutch assembly according to claim 22 further comprising a filter (150) disposed within the inlet port (146) for removing debris from the hydraulic based fluid used to replenish the reservoir (104).

27. The clutch assembly according to claim 22 further comprising a filter (166) disposed within the reservoir (104) for removing debris from the hydraulic based fluid used to replenish the reservoir (104).

* * * * *